United States Patent [19]
Dalton

[11] 3,882,133
[45] May 6, 1975

[54] MANUFACTURE OF BIPYRIDYLS
[75] Inventor: Raymond Frederick Dalton, Manchester, England
[73] Assignee: Imperial Chemical Industries Limited, London, England
[22] Filed: Nov. 6, 1972
[21] Appl. No.: 303,957

[30] Foreign Application Priority Data
Nov. 15, 1971  United Kingdom............. 52936/71

[52] U.S. Cl............................................. 260/296 D
[51] Int. Cl.............................................. C07d 31/42
[58] Field of Search.................................. 260/296 D

[56] References Cited
UNITED STATES PATENTS
3,697,534  10/1972  Waddan et al................. 260/296 D

OTHER PUBLICATIONS

Roberts et al., Basic Principles of Organic Chemistry, Benjamin Publishers, Page 806, QD 251R.58 C.6 (1965).

*Primary Examiner*—Alan L. Rotman
*Attorney, Agent, or Firm*—Cushman, Darby & Cushman

[57] ABSTRACT

Pyrdine and alkyl pyridines are converted into 2,2'-bipyridyls by heating with salts of pyridines or of quaternised pyridines. The salts may be preformed or prepared in situ.

6 Claims, No Drawings

MANUFACTURE OF BIPYRIDYLS

This invention relates to a process for the manufacture of bipyridyls.

According to the invention there is provided a process for the manufacture of 2,2'-bipyridyl and alkyl derivatives thereof which comprises heating pyridine or an alkyl derivative thereof having at least one free α-position with a salt of a pyridine or of a quaternised pyridine in which the quaternising group is an aliphatic or cycloaliphatic group or substituted derivative thereof.

As alkyl derivatives of pyridine there are mentioned especially α, β and γ-picoline, but pyridines containing higher alkyl groups or more than one alkyl group may be used as long as there is a free α-position.

The salt may be derived from pyridine itself or for example from alkyl pyridines, especially from alkylpyridines having a free α-position, or from 2,2'-dipyridyl itself, or from radicals derived from these by quaternisation. As example of such salts there may be mentioned especially halides, particularly chlorides and bromides.

As a salt of a pyridine there may be mentioned pyridine hydrochloride which may be preformed or prepared in situ by adding hydrogen chloride to the pyridine.

The salt of a quaternised pyridine may be preformed by well-known and conventional methods for use in the process or may be prepared in situ from an appropriate pyridine and quaternising agent. As examples of such quaternising agents which may be used to prepare quaternary salts for use in the process there are mentioned methyl iodide, ethylene dichloride, ethylene dibromide, acetyl chloride, α, α'-dichloroacetone, and o-xylylenedibromide.

It is preferred that the salt be derived from the same pyridine (whether quaternised or not), especially pyridine itself, that is used in the process of the invention.

The process of the invention may be carried out by mixing the pyridine or alkyl derivative thereof with either the salt or with an appropriate acid or quaternising agent and heating the mixture in a sealed vessel to a temperature between 300° and 400°C. The preferred reaction temperatures are between 320° and 350°C. The reaction time will depend upon the reaction temperature but it is usually preferred to use at least 3 hours.

Any amount of salt or ingredients thereof down to about 2% of the weight of pyridine may conveniently be used, but it is preferred to use between 4 and 40% of the weight of pyridine.

The 2,2'-bipyridyl may be isolated from the reaction mixture in any conventional manner, for example by removal of the pyridine by distillation at atmospheric pressure, and distillation of the 2,2'-bipyridyl at reduced pressure.

The invention is illustrated but not limited by the following Examples in which all parts and percentages are by weight unless otherwise stated.

EXAMPLE 1

Bis pyridinium ethylene dibromide (5 parts) and pyridine (25 parts) were added to a 100 ml Carius tube which was sealed and heated at 340°C for 10 hours giving a dark brown liquid, which on analysis was shown to contain 4.53 parts of 2,2'-bipyridyl, and no other detectable bipyridyl isomers.

EXAMPLE 2

Ethylene dichloride (3 parts) and pyridine (25 parts) were heated at 340°C for 10 hours. Analysis showed the formation of 2.15 parts of 2,2'-bipyridyl.

EXAMPLE 3

1,1'-Ethylene-2,2'-bipyridium dibromide (5 parts) and pyridine (25 parts) were heated at 340°C for 10 hours to give 3.02 part of 2,2'-bipyridyl.

EXAMPLE 4

N-methylpyridinium iodide (5 parts) and pyridine (25 parts) on heating at 340°C for 10 hours gave 3.2 parts of 2,2'-bipyridyl.

EXAMPLE 5

Pyridine hydrochloride (5 parts) and pyridine (25 parts) were heated at 340°C for 10 hours to give 5.6 parts of 2,2'-bipyridyl.

EXAMPLE 6

The bis pyridinium quaternary salt of o-xylylene dibromide (1 part) and pyridine (25 parts) were heated at 340°C for 10 hours to give 1.55 parts of 2,2'-bipyridyl.

EXAMPLE 7

Acetyl chloride (1 part) and pyridine (25 parts) on heating at 340°C for 10 hours gave 1.7 parts of 2,2'bipyridyl.

I claim:

1. A process for the manufacture of 2,2'-bipyridyl and dimethyl derivatives thereof which comprises heating at a temperature of between 300° and 400°C. pyridine or α, β or γ-picoline with from 2 to 40% of its weight of a halide salt of pyridine or of a quaternised pyridine, the pyridine being selected from pyridine itself, α, β or γ-picoline and 2,2'-dipyridyl and the quaternised group being derived from a member selected from the group consisting of methyl iodide, ethylene dichloride, ethylene dibromide, acetyl chloride, α, α'-dichloroacetone or o-xylylene dibromide and wherein from 2% to 40% of the salt, based on the weight of the pyridine, is used.

2. A process as claimed in claim 1 in which the salt of the pyridine or the quaternised pyridine corresponds to the pyridine or picoline used in the process.

3. A process as claimed in claim 1 in which the salt of a pyridine or of a quaternised pyridine is obtained by salt formation or quaternisation respectively from 2,2'-bipyridyl.

4. A process as claimed in claim 1 wherein the salt of a pyridine is pyridine hydrochloride.

5. A process as claimed in claim 1 in which the salt of a pryidine or of a quaternised pyridine is formed in situ from the pyridine and an acid or quaternising agent.

6. A process as claimed in claim 1 in which the salt is used in in amount between 4 and 40% of the weight of pyridine.

* * * * *